March 7, 1961  G. A. LYON  2,973,843
BRAKE DRUM COOLING RING STRUCTURE
Filed March 10, 1958  2 Sheets-Sheet 2
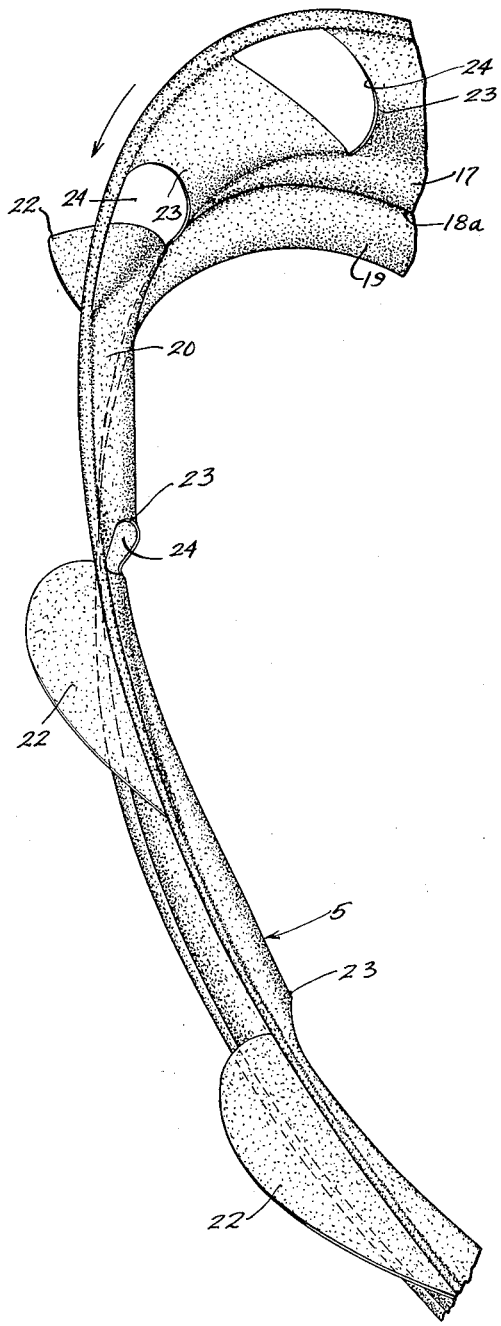
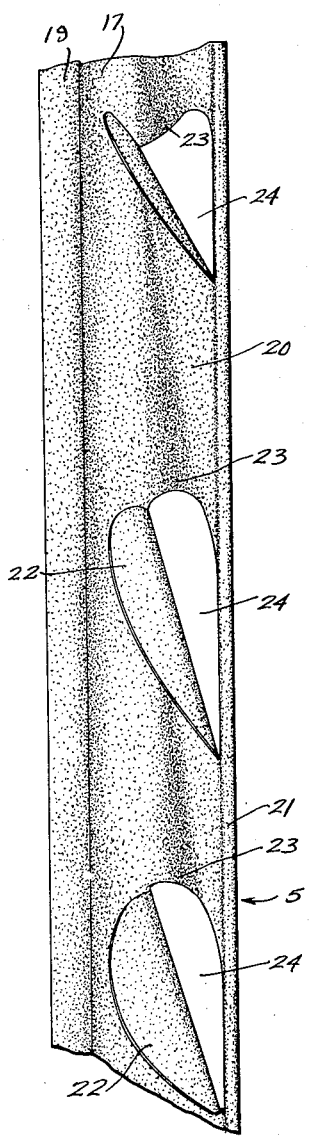
Inventor
George Albert Lyon United States Patent Office 2,973,843
Patented Mar. 7, 1961

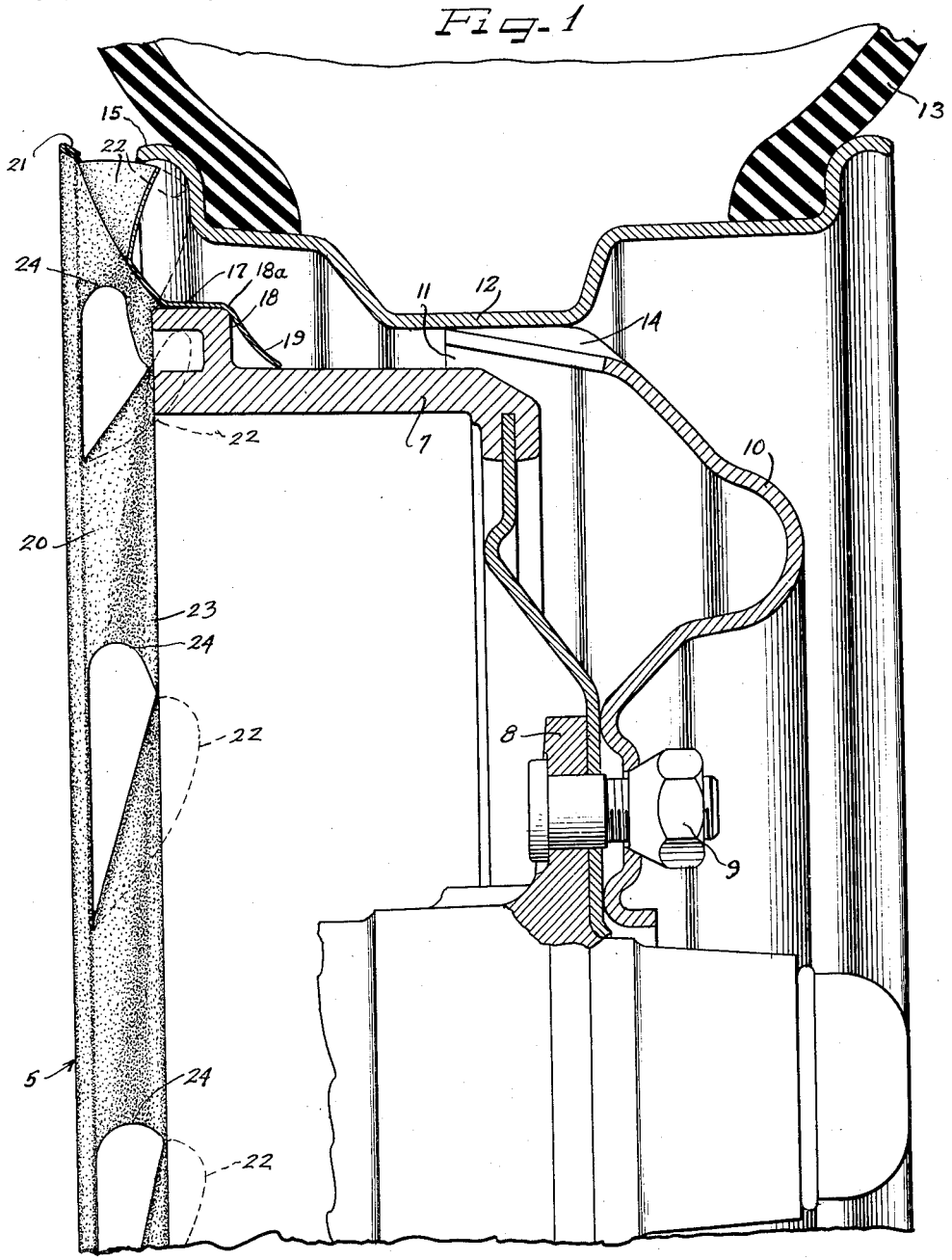

2,973,843
BRAKE DRUM COOLING RING STRUCTURE
George Albert Lyon, 13881 W. Chicago Blvd., Detroit, Mich.
Filed Mar. 10, 1958, Ser. No. 720,393
9 Claims. (Cl. 188—264)

The present invention relates to improvements in means for cooling the brake drums of automotive vehicles and more particularly relates to a device that is adapted to be applied optionally to a vehicle wheel for assisting in cooling the brake drum during running of the wheel.

Due to higher speeds and larger braking surfaces, the brake mechanisms of automobile wheels are highly subject to excessive heating in service.

An important object of the present invention is to provide improved means for cooling automobile brake drums by promoting air circulation over and past the brake drum in each instance during running of the wheel.

Another object of the invention is to provide a simple and efficient ring device for effecting brake drum cooling.

A further object of the invention is to provide a novel brake drum cooling ring structure of high efficiency.

Still another object of the invention is to provide an efficient brake drum cooling ring structure operable on the brake drum and in association with the associated tire rim of the wheel to afford an effective air scoop and impeller relationship.

A still further object of the invention is to provide an improved brake drum cooling ring structure operable to scoop and impel air from both sides of the ring body thereof incident to rotation with the wheel in service.

It is also an object of the invention to provide an effective brake drum cooling ring structure that can be produced at low cost from sheet metal.

Other objects, features and advantages of the present invention will be readily apparent from the following detailed description of a preferred embodiment thereof taken in conjunction with the accompanying drawing, in which:

Figure 1 is a fragmentary radial sectional elevational view through a wheel structure showing brake drum cooling ring of the present invention applied thereto;

Figure 2 is a fragmentary perspective view of the cooling ring structure; and

Figure 3 is a fragmentary edge plan view of the ring member.

A brake drum cooling ring 5 embodying features of the invention is constructed and arranged to be mounted on the axially inner side of a vehicle wheel including a brake drum 7 mounted upon an axle hub flange 8 to which is also secured by cap screws or bolts 9 a disk spider wheel body 10 provided with a peripheral attachment flange 11 suitably secured to a base flange 12 of a multiflange drop center tire rim constructed and arranged to carry a tubeless tire 13. Respective openings 14 may be provided in the periphery of the wheel body at juncture with the tire rim for air circulation through the wheel and through the gap between the brake drum 7 and the encompassing radially spaced axially inner portion of the tire rim which includes an axially inner terminal flange 15.

According to the present invention, the cooling ring 5 is constructed in a manner enabling it to be made from a single piece of material such as sheet metal rolled or drawn into shape. Stainless steel, brass, aluminum alloy, or other suitable sheet material may be used for the purpose.

Means are provided for concentrically supporting the cooling ring 5 in mounted relation upon the axially inner portion of the brake drum 7. To this end, the ring has a circular generally axially extending body flange portion 17 of a diameter to fit telescopically about an inner marginal radially outwardly projecting boss or rib structure 18 on the brake drum. Herein the construction and relationship is such that the ring 5 is adapted to be mounted on the brake drum 7 before the wheel is applied to the axle so that the ring member can be moved into position axially from the outer side of the brake drum toward the axially inner side and until a generally axially inwardly facing shoulder 18a adjacent juncture of a generally radially inwardly directed and axially outwardly sloping marginal flange 19 at the axially inner end of the ring member with the body 17 makes stopping, ring-positioning engagement with the axially outer side corner of the brake drum rib or shoulder means 18. Either the tip of the flange 19 or the portion of the ring body 17 adjacent to the shoulder 18, or both may be sized to effect reasonably firm engagement with the immediately adjacent surrounded portion of the brake drum at least in the fully assembled relationship with the brake drum. It may be noted that the body portion 17 of the ring may be of slightly flaring cross-section, that is slightly larger in diameter at its axially inner portion than at its axially outer portion adjacent to the stop shoulder 18a so as to facilitate sliding the ring into the assembled relationship about the brake drum rib shoulder 18 but in the final assembly effecting reasonably close, firm engagement which will not only avoid looseness or rattle, but will afford heat transfer from the brake drum to the ring member and will substantially damp high frequency vibrations by virtue of the out of phase vibrational characteristics of the ring relative to the brake drum. With respect to vibration damping, the construction and relationship of the flange 19 extending obliquely radially inwardly toward and preferably into contact with the smaller diameter portion of the brake drum 7 relative to the shoulder rib or boss means 18 further assures vibration absorption and dissipation by imposing a further out of phase characteristic into the ring and brake drum assembly. This feature is further enhanced by the generally concave convex, bowed, arcuate cross-section of the flange 19.

For promoting air circulation about the brake drum 7, the ring 5 is provided with an axially inwardly and radially outwardly directed flaring annular air scoop flange portion 20 extending angularly from the axially inner end of the body portion 17 and preferably of substantially greater width and in this instance over twice as wide as the body portion 17 so as to extend in the assembly in substantial spaced axially inwardly overlying relation to the tire rim innerside terminal flange 15. Thereby, the air gap between the tire rim and the brake drum 7 is extended substantially axially inwardly and radially outwardly to and beyond the tip of the terminal flange 15. Through this arrangement, the flaring scoop portion 20 operates in the rotating forward travel of the wheel to scoop air into the gap between the tire rim and the brake drum for circulation in cooling relation about the brake drum as well as through the wheel openings 14.

For finishing and reinforcement, the terminal extremity of the scoop portion 20 is provided with a continuous annular turned reinforcing flange 21 which, as will be observed in Fig. 2, by its generally axially inward direction serves to increase the over-all axial scooping width of the scoop portion.

Improved air circulation is afforded by a plurality of air motivating vanes 22 on the annular scoop portion 20 and projecting from the axially outer side thereof toward the terminal flange 15 in the assembly. In the present instance, the vanes 22 are struck integrally from the material of the scoop portion 20 and are bent from the scoop flange portion 20 generally radially outwardly as best seen in Figures 2 and 3 and along diagonal lines extending from adjacent to the reinforced edge 21 to adjacent juncture of the scoop flange portion 20 with the ring body 17, with the trailing end of the bend lines being adjacent to the body 17, having regard to the direction of rotation of the ring member in service. The shape of the vanes 22 is preferably generally lobe ear like and predetermined to enable the distal enlarged portions of the vanes to project generally axially outwardly into generally edgewise nested engagement with the terminal flange 15. It will be observed that there is a substantial space between all of the adjacent vanes 22 and that they are elongated generally peripherally with the maximum dimension at their trailing end. The diagonal angle of the vanes circumferentially as well as radially and axially is such as to promote effective impelling of the scooped in air into the rim-drum gap and in cooling relation about the brake drum. In addition, by effecting resilient tensioned engagement of the vanes 22 edgewise against the terminal flange 15, not only is the cooling ring member held firmly in place, but additional improvement in vibration damping and thus sound deadening efficiency is imparted. In addition, by the edgewise generally biting engagement of the vanes 22 with the terminal flange 15, turning of the ring 5 on the wheel is effectively resisted for positive co-rotation.

Air scooping, circulation efficiency of the ring member 5 is further improved by the construction of the scoop flange portion 20 of the ring member for scooping of air from the radially and axially inner side of the scoop flange toward the radially and axially outer side and into the rim-drum gap. To this end, the areas of the scoop flange 20 intervening circumferentially between the vanes 22 are shaped to provide respective channel-shaped scoops 23 having the mouth ends thereof at the maximum width trailing end portions of openings 24 left in the scoop flange 20 by striking out of the vanes 22. As best seen in Figure 2 but also well indicated by the shading in Figures 1 and 3, each of the scoops 23 is elongated circumferentially and tapers from its mouth toward a trailing end adjacent to the next adjacent one of the vanes 22 in the trailing direction. Moreover, each of the scoops 23 is biased toward the axially outer side or margin of the scoop flange 20. As a result, air scooped in by each of the scoops 23, especially at the rear side of the wheel as the wheel is traveling forwardly in running is diverted toward the brake drum side of the scoop flange 20 and toward the adjacent trailing end vane 22 for deflection by such vane in each instance generally axially outwardly and into the drum-rim gap for brake drum cooling.

It is thus apparent that not only does the cooling ring 5 scoop in air at the forward side of the wheel but also at the rear side of the wheel in running and in any event stagnation of air within the confines of the circle described by the ring scoop flange 20 is precluded. The brake drum cooling ring 5 is thus highly efficient for its intended purpose.

It will be understood that modifications and variations may be effected without departing from the scope of the novel concepts of the present invention.

I claim as my invention:

1. In a wheel structure including a brake drum and an encompassing tire rim providing therebetween an air gap that opens axially inwardly of the wheel, an air circulation promoting ring member engaged about the brake drum and having a generally axially inwardly and radially outwardly flaring annular scoop flange portion disposed in spaced relation to the tire rim to provide therewith an extension of the air gap opening generally radially outwardly, said air scoop flange having struck therefrom and bent angularly thereto a plurality of air circulation vanes directed toward the tire rim and with air scoops having their mouth ends channelled from the trailing ends, relative to the direction of rotation of the wheel, of the apertures from which the vanes are struck and trailing toward the respective next adjacent vane in the trailing direction.

2. In a brake drum cooling ring, a circular generally axially extending body having means on the axially outer end thereof for attachment to a brake drum and a generally radially outwardly flaring axially inner annular scoop flange portion, said scoop flange portion having the edge thereof reinforced and finished by a generally axially inwardly and radially outwardly turned continuous annular flange increasing the over-all axial scooping width of the scoop flange.

3. In a brake drum cooling ring, a circular generally axially extending body having means on the axially outer end thereof for attachment to a brake drum and a generally radially outwardly flaring axially inner annular scoop flange portion, said scoop flange portion having struck therefrom toward the radially and axially outer side thereof a plurality of air motivating vanes.

4. In a brake drum cooling ring, a circular generally axially extending body having means on the axially outer end thereof for attachment to a brake drum and a generally radially outwardly flaring axially inner annular scoop flange portion, said scoop flange portion having struck therefrom toward the radially and axially outer side thereof a plurality of air motivating vanes, said scoop flange also having a plurality of generally circumferentially directed air scoops with the mouth ends thereof at the apertures from which the vanes are struck.

5. In a brake drum cooling ring, a circular generally axially extending body having means on the axially outer end thereof for attachment to a brake drum and a generally radially outwardly flaring axially inner annular scoop flange portion, said scoop flange portion having struck therefrom toward the radially and axially outer side thereof a plurality of air motivating vanes, said scoop flange having a plurality of generally circumferentially directed air scoops with the mouth ends thereof at the apertures from which the vanes are struck and directed to open in the direction of rotation of the ring on and with a wheel with which the ring may be assembled, said scoops tapering toward the next adjacent trailing of the vanes in each instance and being angled generally axially outwardly.

6. In a brake drum cooling ring structure, a circular generally axially extending cooling ring member having means thereon for attachment to a brake drum and provided with a flaring generally radially outwardly and axially inwardly directed annular scoop flange affording a generally radially and axially outer side scooping surface, the scoop flange having pressed up from the axially and radially inner side thereof a plurality of air scoops opening circumferentially in the direction of rotation of the ring and tapering in the trailing direction.

7. In a brake drum cooling ring structure, a circular generally axially extending cooling ring member having means thereon for attachment to a brake drum and provided with a flaring generally radially outwardly and axially inwardly directed annular scoop flange affording a generally radially and axially outer side scooping surface, the scoop flange having pressed up from the axially and radially inner side thereof a plurality of air scoops opening circumferentially in the direction of rotation of the ring and tapering in the trailing direction, said scoops being angled in the trailing direction toward juncture of the scoop flange with the body of the ring.

8. In a wheel structure including a brake drum and an encompassing tire rim having an axially inner side terminal flange, the brake drum and tire rim being in spaced air gap relation with the gap opening at the axially inner side of the wheel generally between the axially inner end of the brake drum and said axially inner side terminal flange, an annular flaring air scoop ring flange of a diameter to overlie the terminal flange in spaced relation with a free edge portion of the scoop flange spaced axially inwardly from the terminal flange and defining therewith a generally radially outwardly opening extension of said gap, said scoop flange having spaced radially inwardly and axially outwardly from said edge a brake drum engaging flange structure including an annular sloping marginal flange of bowed cross-section and with its edge projecting toward and engaging the brake drum in vibration damping relation.

9. In a wheel structure including a brake drum and an encompassing tire rim having an axially inner side terminal flange, the brake drum and tire rim being in spaced air gap relation with the gap opening at the axially inner side of the wheel generally between the axially inner end of the brake drum and said axially inner side terminal flange, an annular flaring air scoop ring flange of a diameter to overlie the terminal flange in spaced relation with a free edge portion of the scoop flange spaced axially inwardly from the terminal flange and defining therewith a generally radially outwardly opening extension of said gap, said ring flange having an inner marginal portion retainingly engaged with the brake drum, and a circumferentially spaced series of generally axially outwardly directed air motivating vanes extending from the ring flange across said gap extension and into engagement with the terminal flange and coacting with the inner marginal portion for retaining the ring flange in position.

References Cited in the file of this patent

UNITED STATES PATENTS

| | | |
|---|---|---|
| 2,745,519 | Lyon | May 15, 1956 |
| 2,795,302 | Gaylord | June 11, 1957 |
| 2,808,908 | Lyon | Oct. 8, 1957 |
| 2,808,909 | Lyon | Oct. 8, 1957 |
| 2,808,910 | Lyon | Oct. 8, 1957 |
| 2,809,318 | Lyon | Oct. 8, 1957 |
| 2,857,022 | Lyon | Oct. 21, 1958 |